J. J. CHAPEL.
FISH BAIT.
APPLICATION FILED OCT. 26, 1918.

1,377,309.

Patented May 10, 1921.

WITNESS:
T. J. Britt

INVENTOR
Jesse J. Chapel
BY
ATTORNEY

UNITED STATES PATENT OFFICE.

JESSE J. CHAPEL, OF PACKWAUKEE, WISCONSIN.

FISH-BAIT.

1,377,309.    Specification of Letters Patent.    Patented May 10, 1921.

Application filed October 26, 1918. Serial No. 259,848.

*To all whom it may concern:*

Be it known that I, JESSE J. CHAPEL, a citizen of the United States, and resident of Packwaukee, in the county of Marquette and State of Wisconsin, have invented certain new and useful Improvements in Fish-Bait; and I do hereby declare that the following is a full, clear, and exact description thereof.

My invention relates to new and useful improvements in artificial fishing baits, more particularly of that type including a body member adapted to be drawn through the water to simulate in a general manner the movement of a minnow. Baits of this type have usually been provided with a plurality of hooks secured permanently along the sides and at the rear thereof. It has heretofore been found practically impossible to provide a bait of this character, which when drawn through water containing various marine growths, would not so clog with such growths as to materially affect its efficiency by reason of the hook connections thereon.

It is primarily the object of my invention to provide a bait of this general type which is practically weedless.

A further and important object resides in the provision of a bait of this character which may be detachably associated with various types of hooks, or whereby various bait members may be selectively associated with a single hook, to most readily meet various conditions of fishing.

A still further object resides in the provision of a bait of this character, which is exceedingly simple in structure and durable with respect to the rough usage to which it would be subjected in successful fishing operations.

With the above and other objects and advantages in view, which will be apparent as the description proceeds, my invention resides in the novel features of construction, combination and arrangement of parts as hereinafter described and defined by the appended claims.

Figure 1:
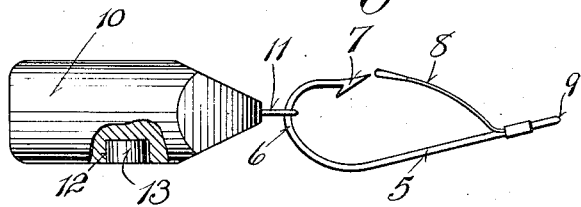
Figure 1 is a side elevational view of my improved fishing bait applied to an ordinary "weedless" hook.
Figure 2:
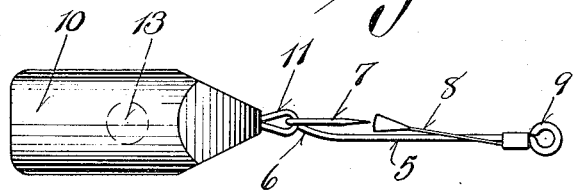
Fig. 2 is a plan view of the bait and hook.
Figure 3:
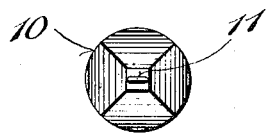
Fig. 3 is a front end view of my bait.

Referring now more particularly to the accompanying drawings, there is shown a conventional fishing hook comprising the shank 5, bight 6 and pronged bill 7, a weed guard 8 of spring wire being secured at one end to the shank adjacent its attaching eye 9 and having its other end flattened to protect the point of the bill. My improved bait simply comprises a preferably cylindrical body 10 formed of wood or other buoyant and durable material. One end of the body is taperingly reduced, being provided with convergent top, bottom and side plane faces, and secured to this end of the bait is an attaching eye 11 adapted to receive the bill of the hook therethrough whereby the eye may be disposed loosely on the bight of the hook. The intermediate portion of the body 10 is provided with a well 12 in which is disposed a weight 13 which determines the bottom of the bait when it is immersed in the water, and it is particularly noted that the weight is disposed in that portion of the periphery of the body most remote from the plane of the attaching eye 11 of the bait, whereby to hold the attaching eye horizontally and to consequently hold the hook in a vertical plane as shown in Fig. 1 to insure a most efficient action.

The size of the weight 13 obviously determines the depth at which the bait will be immersed when drawn through the water, and a most ready control for the desired depth of the bait is thus provided, it being noted that the weight may be so lightened that the bait may be used on the surface of the water, these variations of use being adapted for various fishing conditions, and in fishing for pickerel and like fish I have found it expedient to make the weight and the size of the body of such relative proportions that the body will barely float when placed by itself in the water, additional weight of the hook when the bait is secured thereto serving to procure a proper and most sensitive degree of immersion. In drawing the bait through the water, an effective wriggling action is set up by reason of the loose connection of the eye 11 with the hook, and by reason of the beveled faces of the attaching end of the bait body.

The bait may be provided in various sizes and colors to meet differing fishing conditions, and by reason of the ready feature of attachment, may be interchangeably associated with hooks of various sizes. Continued experiment has demonstrated that the present bait is highly efficient, and by reason of the absence of any hook connections or the like other than the eye 11 at its front end, it is entirely weedless and may hence be used under conditions of marine growth prohibiting the use of similar hook carrying baits.

I am aware that baits have been heretofore contemplated of artificial nature adapted to be engaged on a hook, but I am not aware of a bait provided with an eye connection for the bight of the hook whereby to procure ready detachability and whereby to set up an active wriggling action of the bait when drawn through the water.

I claim:

A fishing bait of the class described comprising a body member having a major portion of cylindrical shape, said cylindrical major portion being of substantially uniform diameter throughout its length, one end of the body being substantially square with the axis thereof, the opposite end portion of the body being taperingly reduced and provided with inclined substantially flat top, bottom and side faces, said faces defining substantially square cross-sectional areas throughout said taperingly reduced end portion, an eye extended from the end of said taperingly reduced portion of the body, the entire surface of the body being otherwise devoid of projecting elements, said eye being adapted to loosely receive the bill of a hook therethrough, whereby when the same draws said body member through the water, the same will be evenly oscillated or wabbled both vertically and horizontally to cause the same to travel over a large area.

In testimony that I claim the foregoing I have hereunto set my hand at Packwaukee, in the county of Marquette and State of Wisconsin.

JESSE J. CHAPEL.